H. PEACOCK.
HAY BALER.
APPLICATION FILED FEB. 29, 1916.
1,241,548.
Patented Oct. 2, 1917.
4 SHEETS—SHEET 1.
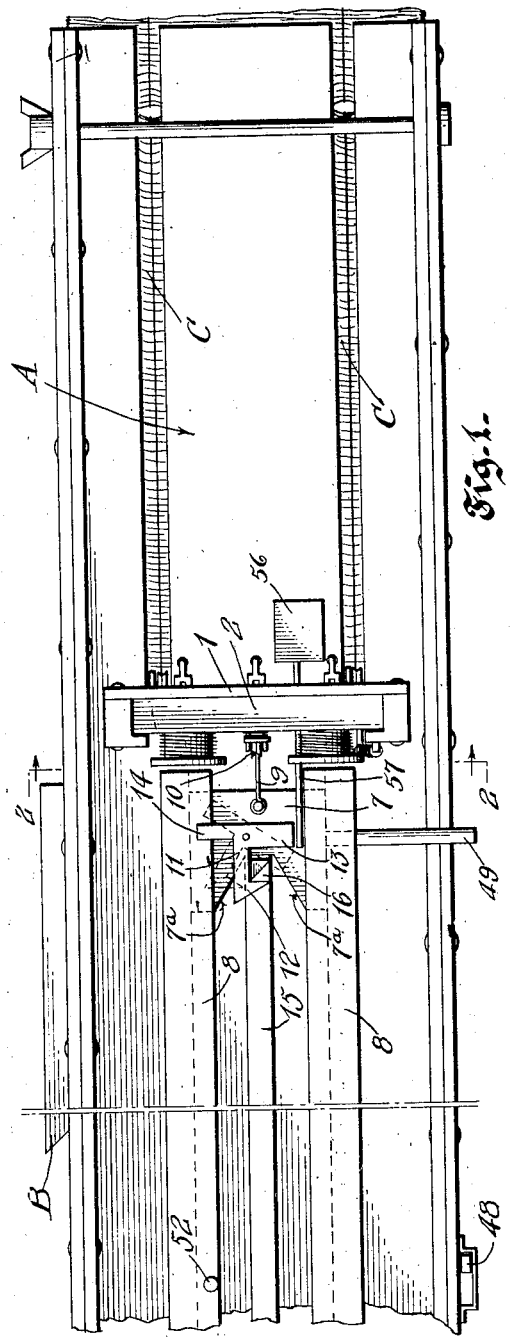
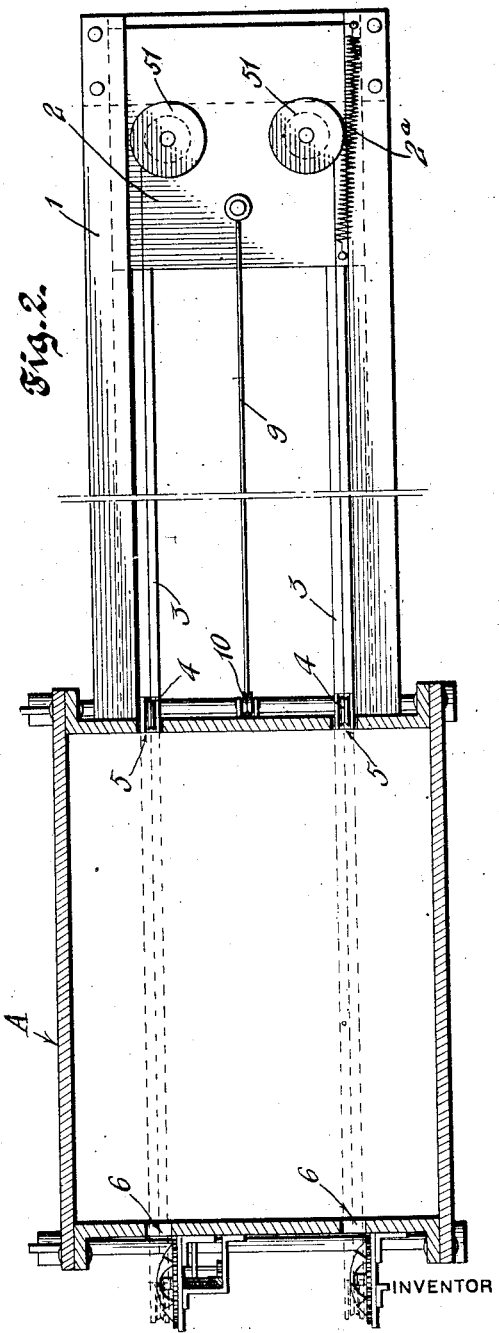
WITNESSES
INVENTOR
Herman Peacock.
BY
ATTORNEY

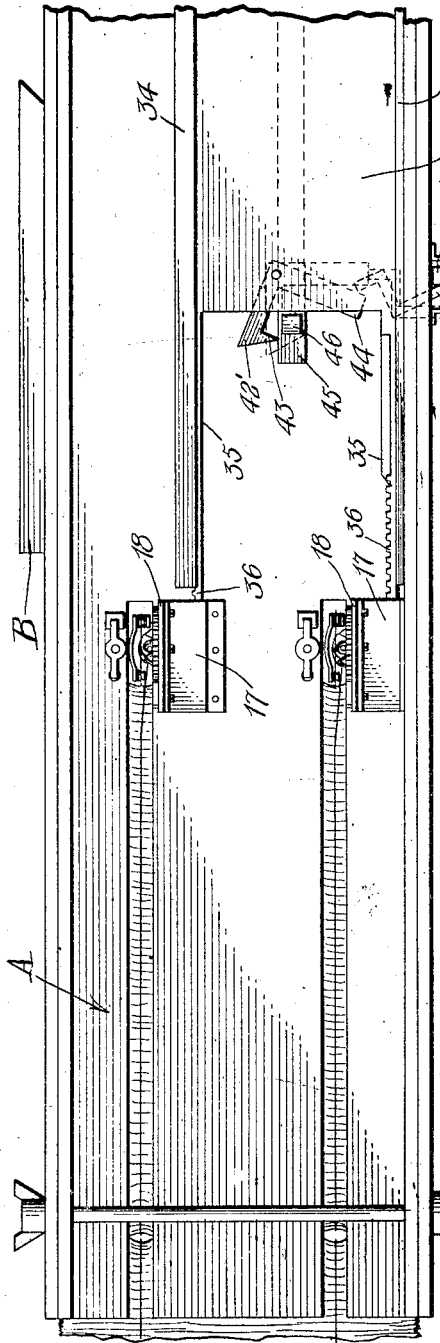
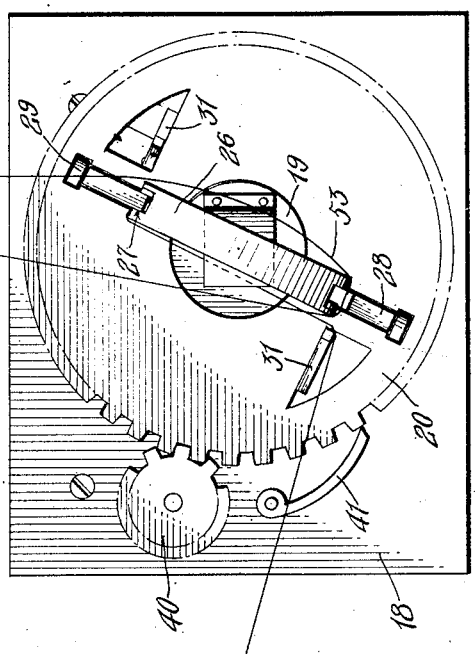
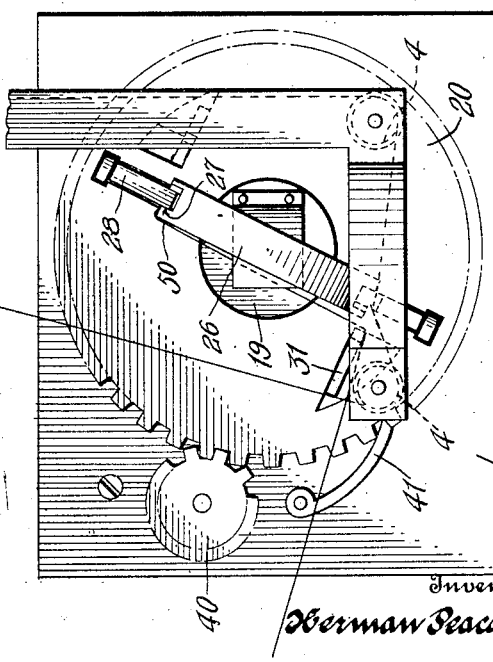

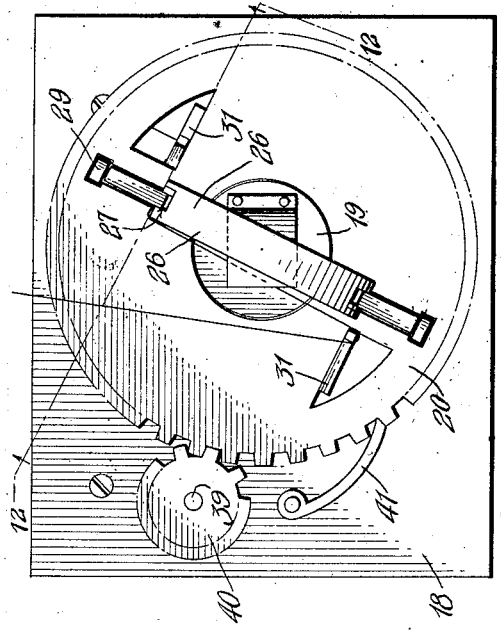
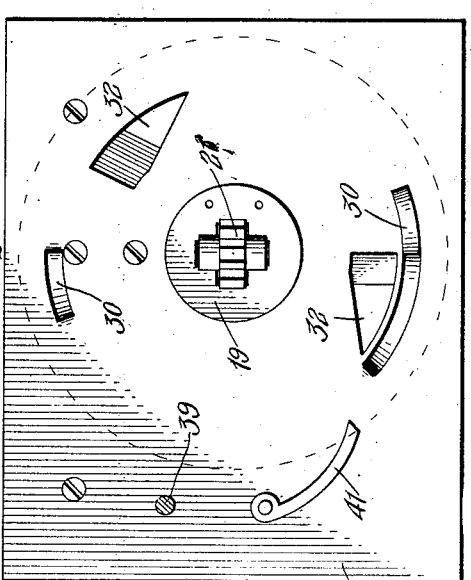
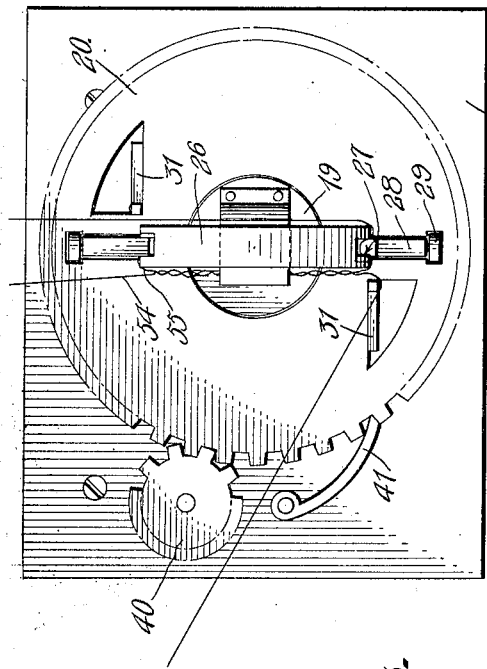
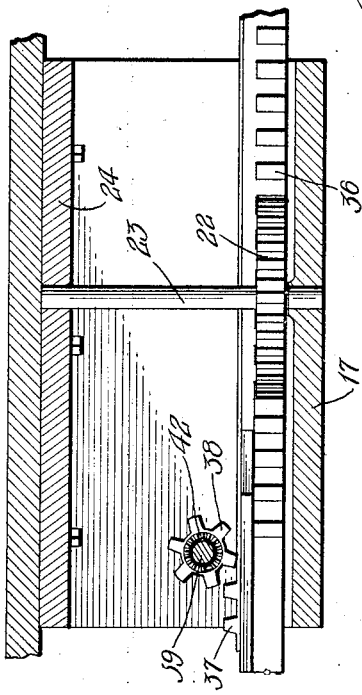

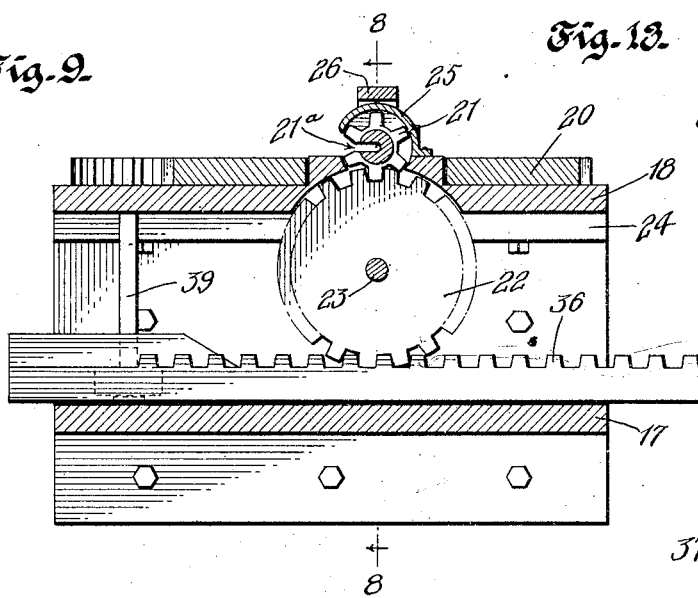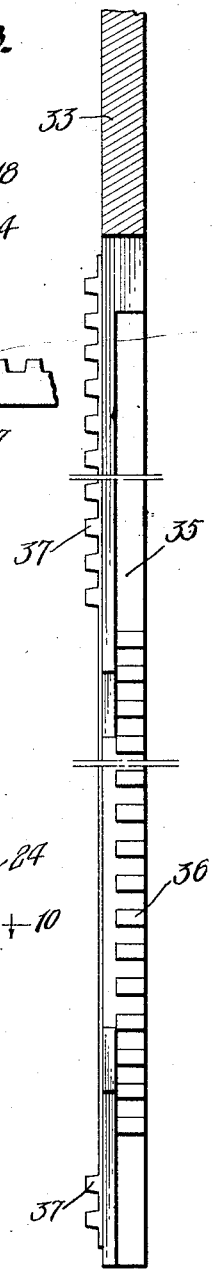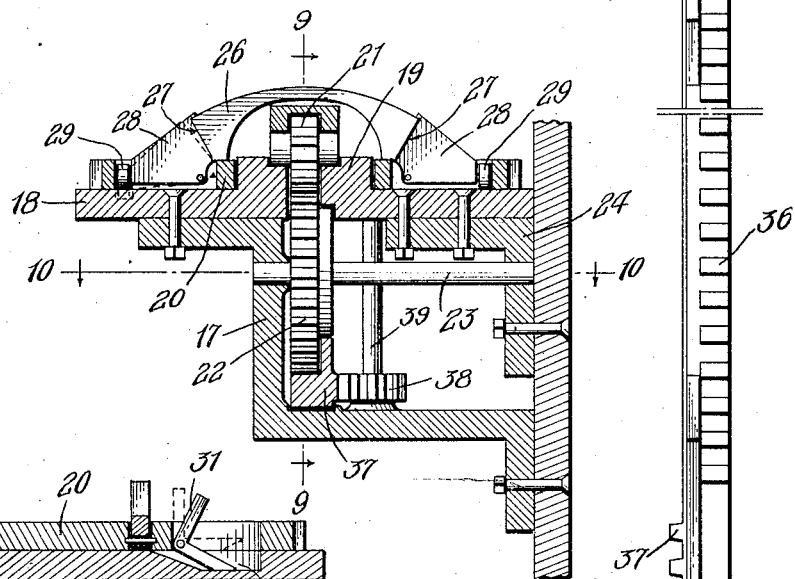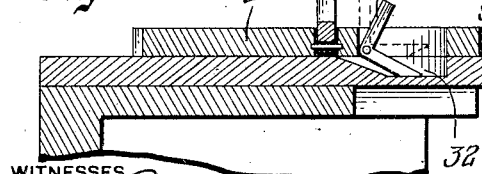

UNITED STATES PATENT OFFICE.

HERMAN PEACOCK, OF PLAINFIELD, INDIANA.

HAY-BALER.

1,241,548.  Specification of Letters Patent.  Patented Oct. 2, 1917.

Application filed February 29, 1916. Serial No. 81,222.

*To all whom it may concern:*

Be it known that I, HERMAN PEACOCK, a citizen of the United States, residing at Plainfield, in the county of Hendricks and State of Indiana, have invented certain new and useful Improvements in Hay-Balers, of which the following is a specification.

This invention relates to hay-baling presses or the like, with special reference to bale tying mechanism therefor, and the nature and objects of the invention will be readily understood by those skilled in the art to which it appertains in the light of the following explanation of the accompanying drawings; illustrating what I now believe to be the preferred embodiment or mechanical expression of my invention, from among other forms and arrangements within the sp  t and scope thereof.

An objec. of the invention is to provide a bale tying mechanism which is absolutely automatic in its operation and which will securely tie one bale after another without the assistance of an operator.

Another object of the invention is to provide a bale tying mechanism of the character described which may be readily attached to hay baling presses of the usual type which are not provided with bale tying means, (and without injuring or altering the press whatsoever.)

In addition to the foregoing, my invention comprehends improvements in the details of construction and arrangement of parts which will be fully described and particularly pointed out in the appended claims.

In the drawings in which corresponding and similar parts are designated by the same reference characters throughout the several views in which they appear:

Figure 1, is a view in side elevation of a portion of a baling press embodying my invention, Fig. 2, is a transverse section taken on the line 2—2 of Fig. 1, Fig. 3, is a view in side elevation of that side of the press opposite to that shown in Fig. 1, Figs. 4, 5, 6, and 7 illustrate the knotting mechanism in various positions, Fig. 8, is a detail sectional view taken on the line 8—8 of Fig. 9, Fig. 9, is a similar section taken on the line 9—9 of Fig. 8, Fig. 10, is a horizontal sectional view taken on the line 10—10 of Fig. 8, Fig. 11, is a detail plan view of one of the knotting mechanisms, with a portion of its superposed mechanism removed, and Fig. 12, is a detail section taken on the line 12—12 of Fig. 7.

Fig. 13, is a detail view in section of a sliding plate for actuating the devices of my invention.

In the accompanying drawings A indicates the body of a hay baling press provided with the usual feeding hopper B. The sides of the body portion are slotted at C to permit the insertion of baling wire in the well known manner.

A guide frame 1 is secured to one side of the press and extends laterally therefrom to form sliding support for a reciprocating member hereinafter termed the needle bar and designated 2. The needle is formed with spaced parallel arms 3 which are guided within the frame and are provided at their outer extremities with pulleys 4. Alined openings 5 and 6 are formed in the side walls of the press and are designed to receive the arms of the needle which is adapted to be reciprocated transversely of the press, and is shown in an operative position in dotted lines in Fig. 2, from which it will be noted, that the extremities of the arms may extend entirely outside of the press wall.

A longitudinally movable cross head 7 is mounted in guides 8 which are secured to the side of the press adjacent the needle bar and a flexible connection 9 is provided having its extremities connected to the cross head and the needle bar and its intermediate portions guided by a stationary pulley 10. A latch member 11 is pivoted to the cross head and is formed with a hooked portion 12 and oppositely extending arms 13 and 14 as shown in Fig. 1. A longitudinally movable bar 15 is secured to some portion of the baling press which moves in unison with the plunger (not shown) and is adapted to operate between the guides 8. The bar 15 is also provided with a lateral pin 16 which is adapted to be engaged by the hooked portion of the latch member 11 the cross-head having flaring edges 7ª to guide the end of the bar toward a centralized position to be securely held between the edge of the cross head and the hooked portion of the latch member. Thus it will be seen that at the end of the forward movement of the plunger carrying the bar 15 with it, said bar will engage the latch member and be securely held and upon a rearward movement of the plunger and bar 15 the cross head will be carried with the bar and consequently exert a pull on the flexible member 9 which transmits its motion to the needle bar resulting in the transverse movement thereof through the body of the baling press.

At the opposite side of the press and located adjacent the openings 6 are knotting mechanisms, two sets having been illustrated but obviously, more may be employed if desired, and a description of one set will suffice for both as they are identical in structure and operation. A bracket 17 is removably secured to the side wall of the press and affords support for a supporting plate 18, which is formed with a central raised portion 19. A gear wheel 20 is mounted for rotation upon the upper surface of the plate 18 and is formed with a central opening for the reception of the raised portion 19. Mounted upon the raised portion in suitable bearings is a pinion 21 formed with a radial slot 21ᵃ, which pinion meshes with a larger pinion 22 journaled upon a shaft 23 which is secured to the bracket 17 and a smaller bracket 24 which bracket also affords partial support to the plate 18. The pinion 21 is covered by a housing 25 and a bridge piece 26 is provided with its ends supported upon the gear 20 and its intermediate portion extending over the pinion 21. The ends of the bridge piece are formed with cutting edges 27 which are adapted to co-act with cutting edges formed upon shearing members 28 pivoted at diametrically opposite points to the gear 20. The shearing members are further provided at their free ends with rollers 29 which have rolling engagement with the upper surface of the gear 20, the surface of the plate 18 being provided with depressed cam portions 30 which are in the path of movement of the aforesaid rollers. It will thus be seen that while the rollers are in engagement with the flat surface of the plate 18 the cutting edges of the shearing members which carry the rollers and the cutting edges of the bridge piece are in operative engagement, and when the rollers are moved over the depressed portions the outer ends of the shearing members are accordingly lowered and the co-acting shear members are separated.

Pivoted to the gear 20 within openings formed thereadjacent the ends of the bridge piece and at diametrically opposite points on the gear with respect to each other are substantially bell-cranked members 31, and depressed portions 32 are formed in the plate 18 which depressed portions are in the path of movement of the depending arms of the bell-cranked members and are adapted to actuate said members in a manner similar to the shearing members.

For operating the above described knotting mechanism I provide a longitudinally movable plate 33 on the side of the press adjacent the knotting mechanism and which is mounted in guides 34. The plate is formed with parallel spaced arms 35 also movable within the guides. On the upper surface of the arms 35 there is provided gear teeth 36 which mesh with the aforedescribed pinion 22 of the knotting mechanism and a second set of gear teeth 37 are formed on the sides of the arms 35 and are adapted to engage a pinion 38 mounted on a vertical shaft 39 which carries and has fixed to it a pinion 40 which in turn meshes with the gear 20 and supplies rotative movement thereto in one direction only and to that end a pawl 41 is pivoted to the plate 18 and engages the periphery of the gear 20, and a pawl and ratchet 42 is mounted on the pinion 38 and shaft 39, thus permitting the said pinion to have locking engagement with the shaft when the pinion is moved in one direction and to rotate freely on the shaft when moved in the opposite direction.

A latch member 42′ provided with a hooked portion 43 and a tripping arm 44 at right angles thereto is pivoted to the plate 33, and a longitudinally movable bar 45 which moves in unison with the plunger is formed with a lateral pin 46 on its end, said pin being adapted to engage the hooked portion of the latch member 42′. A lever 47 formed with oppositely extending ends and an intermediate portion at right angles thereto is pivoted to the side of the press, one of the ends of said lever engaging the tripping arm 44 of the latch member 42′ with the other end engaging the extremity of a lever 48 which is pivoted at its intermediate portion to the underside of the press and extends transversely thereof, said lever 28 having its other extremity in the path of movement of an arm 49 secured to the aforedescribed cross-head 7.

The operation of the machine is as follows:—

Assuming that a charge of hay has been compressed within the walls of the press and the plunger is moving rearward away from the charge, as a result of such movement the needle bar is passed across the rear end of the charge in the manner previously described and a loop of wire is formed around the bale. Referring to Fig. 4 one end of the wire designated 50 is clamped between the co-acting edges of the bridge piece and the shearing member 28, the wire having been thus severed and held during a previous operation of the knotting mechanism. The wire strand is then seen to pass around the upstanding end of one of the members 31 which by the way at this stage of the operation has its horizontal portion engaging the smooth surface of the plate 18. The wire then passes around the bale and around the pulleys 4 on the arms of the needle and thence to a supply reel 51. At the end of the rearward movement of the plunger, the tripping arm 14 of the latch member 11 is engaged by a stop pin 52 extending laterally from one of the guides 8 and the latch member is thereby raised thus releasing the cross head and the needle bar is returned to its former position through the influence of a spring 2ª, leaving the knotting mechanism in the position shown in Fig. 5.

Referring to Fig. 5 it will be noted that a loop of wire designated 53 is formed by the retraction of the needle bar and said loop substantially encircles the bridge piece 26. At the moment when the latch member 11 is tripped as described above the arm 49 engages the lever 48 which in turn transmits its motion to the latch member resulting in the engagement of the plate 33 carrying the arms 35, and said plate and arms are moved rearwardly by the plunger. The gear 20 is rotated through the medium of the rack teeth 37, pinion 38, and pinion 40 which meshes with the gear 20, bringing said gear into the position shown in Fig. 6. It will be noted in this connection that portions of the wire designated 54 and 55 are now disposed in parallel relation owing to the movement of the gear 20 and furthermore the said parallel portions extend into the radial slot 21ª formed in the pinion 21. An instant after the rotation of the gear 20 is accomplished the pinion 21 is then rotated through the medium of the rack teeth 36 and pinion 22, thereby twisting the parallel strands of wire together in the manner shown in Fig. 6. A further rotative movement of the gear 20 brings the rollers 29 out of engagement with the depressed portions 30 into which they had previously dropped and the wires are severed.

During a still further movement of the gear 20 the horizontal portions of the members 31 drop into their corresponding depressed portion in the plate 18 and the loop formed by twisting the wire is released. It will however be noted that the end of the wire which extends from the reel on the needle bar remains held between the edges of one of the shearing members 28 and the bridge piece and during a further movement of the gear 20, the said wire is caught upon the upstanding portion of the member 31 and the knotting mechanism assumes the position shown in Fig. 7, ready for another operation.

For permitting repeated compressions of a hay charge or for permitting of the formation of bales of various sizes I provide a periodically operating mechanism designated 56 which comprises a lever 57 operable by certain mechanism which it is unnecessary to describe in detail. The lever 57 is adapted to be normally raised so as to engage the trip arm of the latch member and thereby prevent the engagement of said latch with the pin 16 of the bar 15, except at the time when the bale tying mechanism is desired to be operated and then the lever 57 falls permitting the engagement between the bar 15 and its correlated latch and the operation of the bale tying mechanism takes place in the manner previously described.

Thus it will be seen that I have provided a bale tying mechanism of extreme simplicity consistent with the operations to be performed, and which mechanism will be furthermore absolutely positive in its operation.

Having thus described my invention what I claim is:—

1. The combination with a baling press including a plunger, of bale tying mechanism, comprising a needle bar for carrying a wire loop transversely across the baling press, a cross head movable longitudinally of the baling press, flexible means for connecting the cross-head to the needle bar, releasable means for connecting the cross-head to the plunger, whereby upon a rearward movement of the plunger the cross-head is simultaneously moved therewith and the needle bar caused to move transversely of the baling press, resilient means for returning the needle bar to its starting position when the cross-head connecting means is released, and wire knotting mechanism.

2. The combination in a hay baling press including a plunger, of a knotting mechanism comprising a horizontal rotating element, a wire twisting pinion stationarily mounted at the center of the rotating element means on the element for holding the free end of the wire, an upstanding post on the rotating element for holding the end portion of the wire within the wire twisting pinion, said wire extending from the post and partly surrounding a bale compressed within the press, means for threading the wire in form of a loop across the free end of the bale, means for securing the loop, means for rotating the element to bring the free end portion and one strand of the loop into parallelism, and within the wire twisting pinion, and means for actuating the loop holding means to sever the other strand of the loop.

3. The combination in a baling press including a plunger of knotting mechanism which comprises a horizontal rotatable element formed on its periphery with gear teeth and a central aperture, a stationary platform for supporting the element and having a raised portion which fits within the aperture, a wire twisting pinion mounted on the raised portion, shearing elements located at diametrically opposite points on the rotating element, pivoted wire engaging standards mounted on the rotating element, a pinion wheel meshing with the periphery of the rotating element, a pawl also engaging the periphery of the rotating element to prevent backward rotation thereof, and means operated by the plunger for rotating the pinion.

4. The combination in a baling press including a plunger of knotting mechanism which comprises a horizontal rotating element provided with gear teeth and a central aperture a stationary platform having a raised portion provided with a wire twisting pinion, a bridge piece which extends across and above the said pinion and is secured at its ends to the rotative element, shearing elements at each end of the bridge piece, upstanding wire engaging posts on the rotative element and means for rotating said element.

5. The combination in a baling press including a plunger of knotting mechanism which comprises a horizontal rotating gear which is formed with a central aperture, a stationary platform formed with an upstanding portion which extends through the aperture for rotation, a wire twisting pinion mounted in bearings on the upstanding portion, a cover partly surrounding the pinion, a bridge piece secured to the gear and extending diametrically across the gear and over the pinion, the bridge piece being provided at each end with cutting edges, shearing blades pivoted to the gear and having cutting edges which co-act with the aforesaid cutting edges of the bridge piece, rollers on the shear blades which bear upon the surface of the platform and are adapted to engage one of the aforesaid depressed portions formed therein, upstanding posts pivoted to the gear at opposite points and which are provided with lateral portions which bear upon the platform and engage the second set of depressions, and means for rotating the gear.

6. The combination in a baling press of knotting mechanism comprising rotative elements provided with gear teeth and wire cutting mechanism, means for twisting the wire, a pinion which meshes with the said rotative element, a shaft fixed to the pinion, a second pinion on the shaft a movable rack bar which engages the second pinion, guides for the rack bar, a spring for holding the rack bar in one position, releasable means connected to the plunger for engaging the rack bar to move same and place the spring under strain, and means for releasing the said rack bar engaging means when the plunger is moved toward its rear position whereby the rack bar is caused to return under the influence of the spring and the rotative element thereby operated.

7. The combination in a baling press including a plunger of knotting mechanism which comprises a rotative element provided with gear teeth and wire cutting mechanism, a pinion which meshes with the said gear, a journaled shaft fixed to the pinion, a second pinion on the shaft, a wire twisting pinion mounted above the rotating element, a large pinion which meshes therewith, a rack bar provided with teeth for engaging the aforesaid second pinion, guides for the rack bar, a latch member pivoted to the rack bar, a bar which moves in unison with the plunger a pin on the extremity of the bar for engaging the latch, the said pin being also adapted to engage the edges of the rack bar whereby the bar and rack are locked together for simultaneous movement when the plunger is retracted to its rear position, means for engaging the latch to trip same and permit the rack bar to return to former position and a spring for insuring said return.

8. The combination in a baling press including a plunger of bale tying mechanism comprising a needle bar on one side of the press and movable transversely therethrough for carrying a loop of wire, a longitudinally movable cross head on the press and connected to the plunger, means for converting the longitudinal movement of the cross head into transverse movement for operating the needle bar, an arm on said cross-head means on the other side of the press for twisting and severing the wire to form a loop around the bale, rack bars on the side of the press adjacent the twisting mechanism and releasable means on the rack bar affording connection therewith for simultaneous movement, a spring for retaining the rack bar in its inoperative position said releasable means being operable by engagement with the arm on the cross head when the plunger is in its rear position.

In testimony whereof I affix my signature in presence of two witnesses.

HERMAN PEACOCK.

Witnesses:
RALPH B. HORNADAY,
EVANGELINE E. COOK.